No. 729,976. Patented June 2, 1903.

UNITED STATES PATENT OFFICE.

JOSEPH TILLMAN, OF QUITMAN, GEORGIA.

PROCESS OF MAKING SUGAR-CANE SYRUP.

SPECIFICATION forming part of Letters Patent No. 729,976, dated June 2, 1903.

Application filed October 18, 1902. Serial No. 127,891. (No specimens.)

*To all whom it may concern:*

Be it known that I, JOSEPH TILLMAN, a citizen of the United States, residing at Quitman, Brooks county, Georgia, have invented new and useful Improvements in Processes of Making Sugar-Cane Syrup, of which the following is a specification.

The juice when extracted from the stalks of sugar-cane through an ordinary sugar-cane mill and put into kettles or other cooking apparatus for cooking purposes must be skimmed as fast as the scum or impurities begin to rise to the surface. When it has been cooked to the syrup state, then add to it one-fifth as much water as there is syrup, as near as may be, and to each gallon of water thus to be added add one table-spoonful, as near as may be, of pulverized nitrate of potassa, when the impurities in the syrup will again rise in scum, which must be skimmed off rapidly with much finer skimmers than is necessary for the first skimming.

I have tested this process on an extensive scale, and it has always proven satisfactory.

What I claim as my invention, and desire to secure by Letters Patent, is—

The herein-described process of making syrup from sugar-cane, which consists in cooking the juice to the syrup state, while repeatedly skimming the same, then adding water and nitrate of potassa in about the stated proportions as mentioned, and then again repeatedly skimming with fine skimmers.

In testimony whereof I have signed my name to this specification in presence of two subscribing witnesses.

JOSEPH TILLMAN.

Witnesses:
GEORGE D. RAYSON,
C. H. REININGTON.